United States Patent Office 3,022,224
Patented Feb. 20, 1962

3,022,224
MAKING L-GLUTAMIC ACID ALONE OR A MIXTURE OF L-GLUTAMIC ACID AND α-KETO-GLUTARIC ACID
Eric A. Borel, Wilmington, Del., assignor to Hercules Powder Company, Wilmington, Del., a corporation of Delaware
No Drawing. Filed June 10, 1960, Ser. No. 35,124
6 Claims. (Cl. 195—29)

The present invention relates to a process of producing a mixture of α-ketoglutaric acid and L-glutamic acid or L-glutamic acid alone and more particularly to microbiologically converting D-glutamic acid in a racemic mixture of DL-glutamic acid to a mixture of α-ketoglutaric acid and L-glutamic acid or to L-glutamic acid alone without substantially affecting the L-glutamic acid in the racemic mixture.

My copending application, Serial No. 35,118, entitled "Biosynthesis of α-Ketoglutaric Acid," filed on even date herewith, includes a process of biologically converting D-glutamic acid in a racemic mixture of DL-glutamic acid to α-ketoglutaric acid without substantially affecting the L-glutamic acid, using a microorganism of the genus Aerobacter. It is pointed out in said copending application that all known methods of making L-glutamic acid by chemical synthesis result in this 50/50 or racemic mixture of L-glutamic acid and D-glutamic acid, that the mixture is useless as such, that the two acids are extremely difficult to separate in the mixture, and that only the L-glutamic acid by itself is the useful acid.

While the process of said copending application gives very good yields, these yields could be increased still further if one could reduce or eliminate the microorganisms' consumption of α-ketoglutaric acid. (The microorganism consumes some of the α-ketoglutaric acid product and some of the D-glutamic acid to grow on.) In attempting to do this I isolated mutants of the microorganism Aerobacter and used them instead of the wild type Aerobacter. Such mutants were isolated following irradiation of the wild type strain with ultraviolet light. After irradiation to a point where approximately 99.5% of the microorganisms were killed, the surviving microorganisms were cultivated in the presence of succinate. The resulting population was then screened for mutants giving a growth response to succinate. The isolation or screening was by one of a number of equivalent well-known and widely used methods in this art. From the data given in the examples hereinafter, it is apparent that such mutants were impaired in the conversion of α-ketoglutaric acid to succinate. The desired results given in the examples and obtained in accordance with this invention are thought to depend on this impairment in the degradation of α-ketoglutaric acid.

According to this invention I have also isolated in a similar manner mutants which give a growth response to hydrolyzed casein. The hydrolyzed casein used in the examples hereof was a tryptic digest, i.e. a material made by the hydrolysis of casein through the action of the enzyme trypsin. This tryptic digest is commercially available under the designation NZ-Case. I have found that a number of these mutants give the surprising results in accordance with this invention.

To my surprise I found that the above mutants not only consumed less α-ketoglutaric acid than the wild type from which there were produced but the mutants also produced substantial amounts of L-glutamic acid in addition to α-ketoglutaric acid, and one of the mutants produced a substantial amount of L-glutamic acid alone. This is a decided advantage because usually L-glutamic acid is the more desired acid and often where α-ketoglutaric acid is the acid produced, one will convert it to L-glutamic acid either by an additional microbiological process or by chemical means. Since the conversion from α-ketoglutaric acid to L-glutamic acid is not 100% efficient, the desirability of going directly to L-glutamic acid instead of via α-ketoglutaric acid is obvious.

I have found that these desirable and surprising results are obtained by carrying out the process which comprises cultivating under aerobic conditions in a nutrient medium including D-glutamic acid, a mutant having the enzyme D-glutamic acid oxidase, the mutant having been obtained from a microorganism of the genus Aerobacter having the enzyme D-glutamic acid oxidase, said cultivation being carried out until a substantial quantity of the D-glutamic acid is converted to a mixture of α-ketoglutaric acid and L-glutamic acid or to L-glutamic acid alone.

The D-glutamic acid in the nutrient medium may be the compound D-glutamic acid as such or it may be D-glutamic acid in admixture with L-glutamic acid either as a racemic mixture, i.e. equal proportions of D-glutamic acid and L-glutamic acid, or a mixture of D-glutamic acid and L-glutamic acid in any other proportions; the recitation in the claims "including D-glutamic acid" is intended to include either of these or any combination thereof. However, one is more apt to be using the racemic mixture.

The following examples illustrate various specific embodiments of this invention, but they are not intended to limit the invention beyond the scope of the claims of this application. In the examples and elsewhere herein percent and parts are by weight. The L-glutamic acid, D-glutamic acid, and the α-ketoglutaric acid were determined by well-known analytical methods commonly used in this art. The L-glutamic acid was determined by the Warburg manometric method used by the Glutamate Manufacturing Association (Methods in Enzymology by Colowick and Katlan, vol. 2, 1955, p. 182, New York Academic Press). The D-glutamic acid and the α-ketoglutaric acid were determined by paper chromatography. The α-ketoglutaric acid was also determined by the Friedemann and Haugen colorimetric method (Friedemann, T. E., and Haugen, G. E., J. Biol. Chem. 147, 415, (1943)).

For the sake of brevity, the following abbreviations are used in the examples of this application: DL-ga means DL-glutamic acid. D-ga means D-glutamic acid. L-ga means L-glutamic acid and α-kga means α-ketoglutaric acid.

I have deposited the mutants of this invention with the American Type Culture Collection (ATCC), and they have given them the ATCC numbers indicated hereinafter.

In the examples 100 ml. portions of an aqueous growth medium of about neutral pH containing 0.5 g. D-glutamic acid and salts in 500 ml. Erlenmeyer flasks were inoculated with 0.1 ml. portions of the mutants liquid stock cultures and incubated at 30° C. in a rotatory shaker. (The stock cultures were considered to contain approximately 10⁻⁹ microorganisms per ml.) The salts were MgSO₄, K₂HPO₄ and NaCl. The results obtained are given in Tables 1 and 2 hereinafter.

Surprisingly, none of the mutants used in the following examples exhibited any absolute growth requirement as compared with the parental wild type from which they were obtained. For instance, even mutants which were isolated as succinate requirers did grow in the absence of succinate. The blocks in these mutants therefore appear to be incomplete. This absence of growth requirement is a further distinct advantage of the present invention.

*Table 1*

SUCCINATE MUTANTS

| Example No. | 1[1] | 2 | 3 | 4 |
|---|---|---|---|---|
| ATCC No. | 129 | 13821 | 13822 | 13823 |
| Incubation Time, hrs. | | 45 | 165 | 93 |
| Percent Conversion to α-kga based on D-ga. | | None | 32 | 17 |
| Percent Conversion to L-ga based on D-ga. | | 30 | 20 | 7 |
| Percent L-ga as compared to initial amount of L-ga. | | 100 | 100 | 100 |
| D-ga left. | | yes | no | no |

[1] Same as Example 1 of Table 2.

*Table 2*

NZ-CASE MUTANTS

| Example No. | ATCC No. | Growth Optical Density at 650 mμ | | pH Change | | Percent Conversion to α-kga Based on D-ga | | Percent L-ga as Compared to Initial Amount of L-ga | | Percent Yield Based on D-ga | | D-ga Left | |
|---|---|---|---|---|---|---|---|---|---|---|---|---|---|
| | | Incubation Time, hrs. | | | | | | | | α-kga and L-ga | L-ga | Incubation Time, hrs. | |
| | | 24 | 48 | 24 | 48 | 24 | 48 | 24 | 48 | | | 24 | 48 |
| 1 | 129 | 1.0 | 1.10 | 8.3 | 8.9 | 39.6 | 44.4 | 100 | 90 | 39.6 | None | No | No. |
| 5 | 13814 | .17 | .55 | 7.6 | 8.5 | 4.4 | 36 | 100 | 115 | 51.0 | 15 | Yes | No. |
| 6 | 13815 | .46 | .80 | 7.8 | 8.7 | 29.4 | 37.8 | 112 | 100 | 41.4 | 12 | Yes | No. |
| 7 | 13816 | .38 | 1.00 | 7.8 | 8.8 | 33.6 | 43.2 | 112 | 80 | 45.6 | 12 | Yes | No. |
| 8 | 13817 | .51 | .83 | 7.8 | 8.7 | 33.6 | 37.8 | 121 | 100 | 54.6 | 21 | No | No. |
| 9 | 13818 | .49 | .78 | 7.9 | 8.7 | 43.2 | 42.6 | 114 | 100 | 57.2 | 14 | No | No. |
| 10 | 13819 | .52 | .80 | 7.8 | 8.7 | 34.2 | 48 | 110 | 100 | 48.0 | 10 | No | No. |
| 11 | 13820 | .42 | .79 | 7.8 | 8.7 | 36 | 48 | 112 | 80 | 48.0 | 12 | Yes | No. |

Example 1—Control. Aerobacter aerogenes ATCC 129 from which mutants of Examples 5–11 were prepared.

The examples in Tables 1 and 2 above give the results of representative experiments carried out in accordance with this invention. As will be seen from these examples, all of the mutants produced substantial quantities of L-glutamic acid, and in addition all of them except Example 2 mutant also produced substantial quantities of α-ketoglutaric acid, that Example 2 mutant produced a quite surprisingly large amount of L-glutamic acid, and that all of the mutants except the Example 2 and the Example 4 mutants produced a substantially greater amount of total acids (L-glutamic acid plus α-ketoglutaric acid) than did the control which was the parental wild type from which the mutants were obtained (Example 1).

As those skilled in this art will appreciate, the conditions set forth in the above examples may be varied considerably within the scope of the present invention defined in the claims of this application.

I prefer to operate at an incubation temperature of about 30° C. At substantially lower temperatures the rate at which the D-glutamic acid is converted to α-ketoglutaric acid becomes slower. In most cases it would be undesirable to operate below about 25° C. Generally, there is no appreciable advantage in operating above about 30° C. The microorganisms are apt to be seriously damaged, if not killed, at a temperature of about 50° C.

A pH of 6–9 is satisfactory as the initial pH of the growth medium, but a pH of about 7.5 is preferred. A pH outside this range is applicable but the conversion rate is slower.

Only those mutants having the enzyme D-glutamic acid oxidase and obtained from a microorganism of the genus Aerobacter having the enzyme D-glutamic acid oxidase are operable in this invention. A large number of Aerobacter mutants not having said enzyme were tested under the conditions of this invention and they did not produce any L-glutamic acid or α-ketoglutaric acid.

This invention has been described with reference to specific embodiments thereof in which a growth medium is inoculated with a microorganism; and without any special treatment or modification of the microorganism, it effects the desired conversion while growing on the medium. Thus it is not necessary to become involved with making cell-free preparations or resting cell preparations from the microorganism and then using these preparations to effect the desired conversion. However, resting cell or cell-free preparations, or isolated pure enzymes, can be used within the scope of this invention.

Thus the present invention provides an effective means whereby the D-glutamic acid isomer in a DL-glutamic acid racemate may be converted to either L-glutamic acid alone or to a mixture of L-glutamic acid and α-ketoglutaric acid without substantially affecting the L-glutamic acid isomer of the racemate. As disclosed more fully hereinbefore, the yields are unexpectedly high. The L-glutamic acid and α-ketoglutaric acid can be separated easily by known means. The α-ketoglutaric acid can be used as such or more L-glutamic acid can be synthesized from it by either chemical or microbiological means well known in this art.

As many apparent and widely different embodiments of this invention may be made without departing from the spirit and scope thereof, it is to be understood that the invention is not limited to the specific embodiments thereof except as defined in the appended claims.

What I claim and desire to protect by Letters Patent is:

1. Process of preparing L-glutamic acid comprising cultivating under aerobic conditions in a nutrient medium including D-glutamic acid, a mutant selected from the group consisting (a) of those characterized by impairment in the conversion of α-ketoglutaric acid to succinate and (b) of those characterized by giving a growth response to hydrolyzed casein, said mutant being obtained from a microorganism of the genus Aerobacter and both the mutant and parential wild type from which the mutant is obtained having the enzyme D-glutamic acid oxidase, said cultivation being carried out until a substantial quantity of the D-glutamic acid is converted to L-glutamic acid.

2. Process of claim 1 wherein the mutant employed is characterized by impairment in the conversion of α-ketoglutaric acid to succinate.

3. Process of claim 1 wherein the mutant employed is characterized by giving a growth response to hydrolyzed casein.

4. Process of claim 1 wherein the mutant employed is obtained from a microorganism of the genus Aerobacter and species *aerogenes*.

5. Process of claim 1 wherein the mutant employed is obtained from *Aerobacter aerogenes* ATCC 129.

6. Process of claim 1 wherein the cultivation is carried out until a substantial quantity of D-glutamic acid is converted to a mixture of L-glutamic acid and α-ketoglutaric acid and the latter two acids are separated.

References Cited in the file of this patent

Izaki et al.: Bull. Agr. Chem. Soc., Japan, volume 19, pages 233–239 (1955), and volume 22, pages 78–84, abstracted in Chemical Abstracts, volume 50, 13166F (1956) and volume 52, 18662b (1958), respectively.

Otsuka et al.: Chemical Abstracts, volume 51 (1957), 7643h to 7644c.